Nov. 14, 1933. O. WALTER Re. 18,999

APPARATUS FOR MAKING ROOF TILES

Original Filed July 10, 1930 2 Sheets-Sheet 1

INVENTOR.
OTTO WALTER.

BY
Lockwood Lockwood Goldsmith & Galt
ATTORNEYS.

Nov. 14, 1933. O. WALTER Re. 18,999

APPARATUS FOR MAKING ROOF TILES

Original Filed July 10, 1930 2 Sheets-Sheet 2

INVENTOR:
OTTO WALTER.
BY Lockwood Lockwood
Goldsmith & Galt
ATTORNEYS.

Reissued Nov. 14, 1933

Re. 18,999

UNITED STATES PATENT OFFICE 18,999

APPARATUS FOR MAKING ROOF TILES

Otto Walter, Perrysville, Ind.

Original No. 1,846,290, dated February 23, 1932, Serial No. 466,972, July 10, 1930. Application for reissue August 11, 1933. Serial No. 684,774

15 Claims. (Cl. 25—43)

The object of this invention is the rapid and economical production of plain roofing tile and the like, made of cement, clay or any suitable material of the kind, which is practically indestructible and as cheap and economical substantially as ordinary wood or paper shingles. Therefore, such indestructible roofing tile is a practical substitute, economical as well as otherwise of wood or paper shingles so that the use of such tiles instead of such shingles will not only provide roofs that will last much longer than shingle roofs, but will eliminate conflagrations and save the country from one of the most common fire hazards.

Said roofing tile, or shingle if one wishes to so call it, can be produced by using cement and sand, cement and burned shale, or any plastic material suitable for the manufacture or roofing. Therefore, since the raw material can be had at almost any point in the United States, such roofing tiles can be manufactured in any locality to great advantage, and thus eliminate the cost of shipping the finished product for any great distance.

In making such roofing tile, the cement and sand, or other suitable material, is formed into a thick fluid condition, which will rapidly flow from the hopper or the like by gravity preferably into one or more mold boxes below. The space in each mold box is uniformly divided by a large number of similar mold plates or like removable mold partitions into mold chambers of similar dimensions for molding the roofing tiles. The mold plates are all alike so that each mold plate will form one side of one roofing tile and the opposite side of the next roofing tile. While the roofing tiles are being formed, as above stated, the mold boxes are constantly vibrated in order to cause the mix of plastic material to settle quickly and uniformly in between the mold plates. Then the mold box is moved to another vibratory support for further shaking down while a succeeding mold box is being changed, and finally the box is slid onto trucks and taken to a curing or drying room. Apparatus of convenient size for carrying out the process has a capacity of 150 roofing tiles per minute or less. This reduces the cost of such tiles as low as, or lower than, ordinary shingles.

An important feature in connection with this speedy manufacture of roofing tiles is the use in each mold box of a large number of entirely similar double faced mold plates, and, therefore, they may be quickly introduced and removed and will make all roofing tiles exactly similar. This contributes greatly to the speed and uniformity of manufacture.

Figure 1:
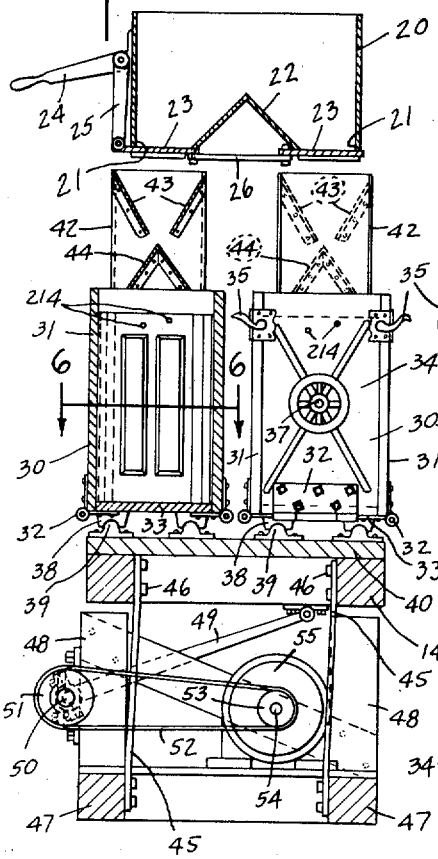
Figure 2:
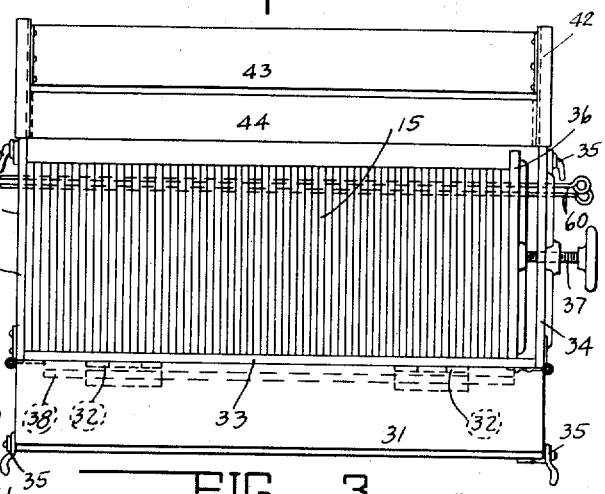
Figure 3:
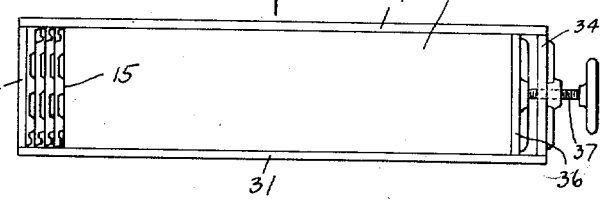
Figure 4:
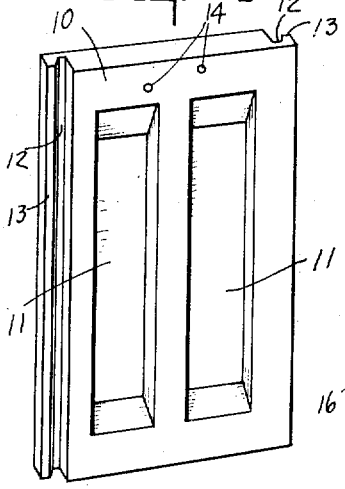
Figure 5:
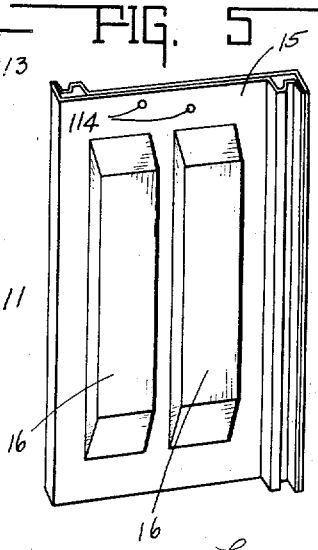
Figure 6:
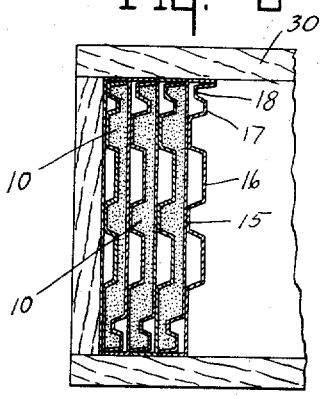
Figure 7:
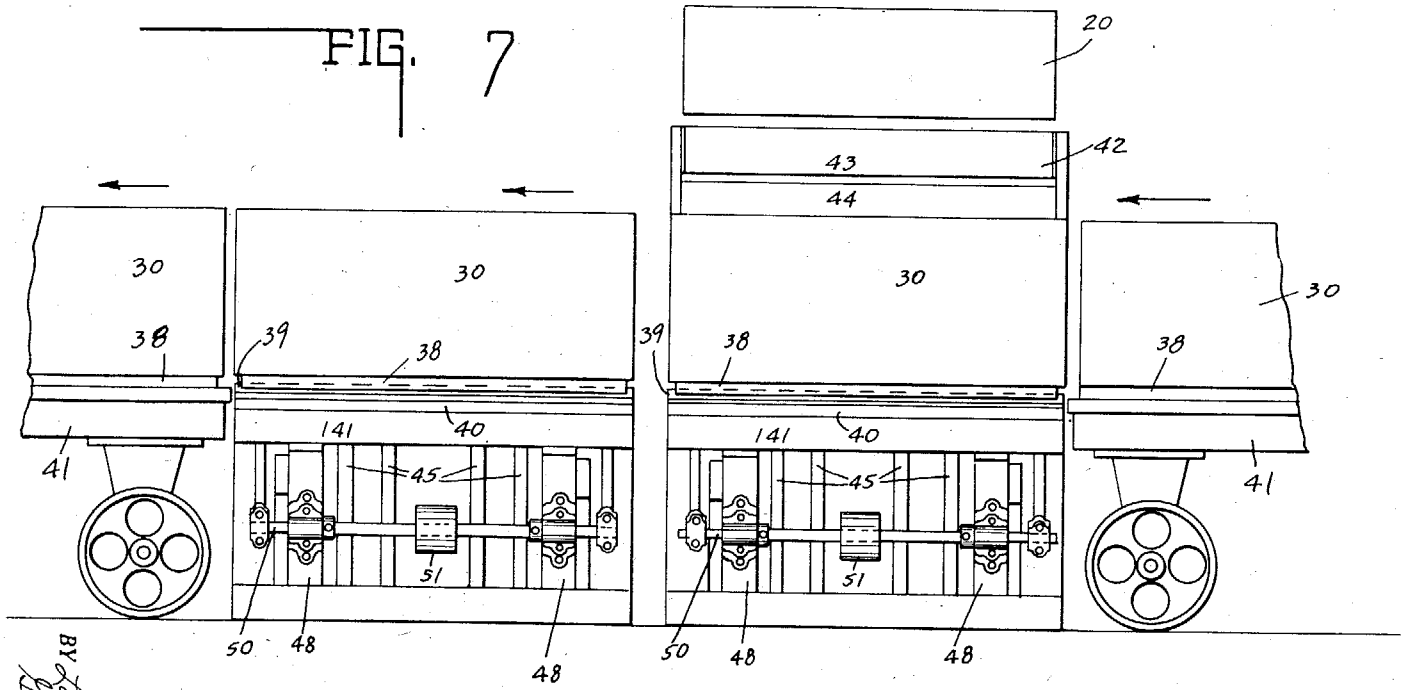

The full nature of the invention will be understood from the accompanying drawings and the following description and claims:

In the drawings Fig. 1 is a vertical transverse section through the machinery for the manufacture of roofing tiles as herein disclosed, one of the mold boxes and the hopper above it, however being shown in end elevation and parts in dotted lines. Fig. 2 is a side elevation of one of the mold boxes with the near side turned down and the hopper above it. Fig. 3 is a plan view of the mold box shown in Fig. 1 and with only a few mold plates therein. Fig. 4 is a perspective view of a roofing tile made by this invention. Fig. 5 is a perspective view of one of the mold plates employed in making said tiles. Fig. 6 is a horizontal section on the line 6—6 of Fig. 1 through a portion of one mold box showing a few mold plates therein and shingles being molded by and between them. Fig. 7 is a side elevation of the apparatus parts being broken away.

The cement roofing tile 10 made by this invention is illustrated in Figs. 4 and 6. It is relatively thin and is reduced in weight by depressions 11 on one side and along diagonally opposite side edges a vertical recess 12 is formed with a spacing rib 13 beside it. The two lateral edges of the tile, therefore are similar, but reversely formed, as shown in Fig. 4, whereby the edges of the roofing tiles are adapted to interlock and be placed on a roof. Each tile is provided with a plurality of nail holes 14, as shown.

The mold plates 15 are all of exactly the same shape and size and are made of thin metal plate with conformations such as will adapt them to form the roofing tile above described. Each mold plate has a plate-like body portion with projecting rib-like members 16 to form the depressions 11 in the tile, and near each edge said mold plate has suitable conformations to provide the tile with its overlapping and interlocking ribs and recesses 12 and 13. To that end the mold plate, as here shown, has on its two lateral edges diagonally opposite spaced ribs or projections 17 and 18 adapted to form the grooves or recesses 12 and the ribs 13 of the tile.

In making said tiles, there is a supply tank 20 for the batch or mix of cement or other plastic materials in fluid form, but so that it will readily flow by gravity. Tank 20 is stationary and has, in the form herein shown, two lateral bottom discharge openings 21 beside a central inclined A-shaped partition 22 which causes the material to flow towards and discharge through the outlets 21. The outlets may be closed by slide valves or plates 23 operated by the hand lever 24 through connecting bars 25 and 26.

The mold boxes 30 are formed preferably as shown in Figs. 1, 2, 3 and 6, and have a knock-down construction by reason of the sides 31 and the ends 34 being hinged at 32 to the bottom 33, so that the ends 34 and sides 31 may be turned down from a vertical position, as shown in Fig. 1, for the removal of the mold plates and roofing tiles therein.

In each mold box, 75 mold plates are placed as shown in Figs. 2, 3 and 6, and the ends and sides moved into closing position, as shown in Fig. 1, and they are held in such positions by latches 35. The mold plates are arranged in the mold box in order exactly the same as seen in Fig. 6, and they are tightened together by a follower 36, seen in Fig. 2, that is put under pressure by a hand screw 37 that extends through the central part of the diagonally reinforced end of the box, as seen in Fig. 1.

The foregoing arrangement provides a series of mold chambers, 75 in each box, which have exactly the same dimensions and superficial outline, whereby uniformity of the roofing tiles 10 is attained. The mold plates in the mold box rest upon the bottom thereof and the tops of the mold plates are exposed and are slightly lower than the walls of the mold box.

The bottom of each mold box is provided with a plurality of metal shoes 38 with longitudinal concave recesses in the underside thereof whereby they are adapted to fit and slide on rails 39 secured on the top of the vibratory frame 40, as seen in Fig. 1.

One of the vibratory frames 40 is located below the supply tank 20 shown in Figs. 1 and 7. The mold boxes, after being equipped as hereinbefore explained, are placed on a factory truck 41, as seen at the right-hand end of Fig. 7, and the truck is moved up endwise against said vibratory frame 40 and the mold boxes are transferred therefrom on the rails 39, as shown in Fig. 1.

After the mold boxes 30 are under the supply tank 20, a distributing hopper 42 is placed upon each mold box, as shown in Fig. 1, and under one of the outlets 21 of the supply tank above. These hoppers are preferably formed, as shown in Fig. 1, with the upper part provided with a pair of downwardly and inwardly sloping hopper walls 43. The latter extend about midway of the hopper and are spaced apart so that the mixture can descend by gravity through their outlet and be thereafter spread by the A-shaped distributor 44 provided in said hopper with the apex centrally located under the outlet from the hopper chamber above and with the bases spaced from the side walls so as to leave suitable outlets at the bottom through which the material flows by gravity rapidly into the chambers between the plates in the mold box. With this hopper distributor, the material enters the mold box near each side and flows from the sides towards the center of the box until it fills the spaces between the mold plates to the top level of the plates.

While the mold boxes are being charged with cement or other material for forming the roofing tiles, the mold boxes are constantly being vibrated laterally in order to facilitate the settling of the material in the mold box and cause the material between the mold plates which form the roofing tiles to become compact, homogeneous and of uniform consistency.

The means for vibrating the mold boxes consists of the vibratory frame 40 which has lateral frame bars 141 supported by resilient vertical bars 45 which are bolted at their upper ends by the bolts 46 to the frame bars 141 and at their lower ends to the frame bars 47. There is a plurality of these resilient bars 45 and in practice I have made them of hickory wood, but they can be made of metal or other resilient material stiff enough to support the frame 40 out of touch with the vertical frame bars 48 below. The vibration is imparted by the connecting bars 49 pivoted to the bars 141 of the vibratory frame 40 and operated by an eccentric shaft 50 mounted on the outer side of the frame bars, as seen in Fig. 1, and which is actuated by a pulley 51 on said shaft, horizontal belt 52, small pulley 53 on shaft 54 and pulley 55 thereon driven from some suitable source of power. It is obvious that the lateral vibratory movement given to the mold boxes will cause the material therein to settle with substantially uniform density and satisfactorily form each roofing tile.

When the mold boxes are filled, the hoppers 42 are removed and the mold boxes advanced upon a second vibratory frame 40, where the mold boxes are further vibrated to complete the molding of the tiles while succeeding mold boxes are being charged. The vibratory frame 40 and all other parts of this second vibratory construction are the same substantially as that shown in Fig. 1. After the material in the mold boxes has been given its second shaking down, the boxes are slid from the rails 39 on the second vibratory frame to a wheeled truck 41 and then wheeled into a drying or curing room or space, not shown.

My experience has demonstrated that I can form in an apparatus of ordinary dimensions with two mold boxes, 150 tiles in a minute. By the means described, the mold boxes are very quickly charged and this speed of production brings the cost of the roofing tiles down at least as low as the cost of ordinary shingles.

This speed of production is due to more than one cause. The chief cause consists in the use of a plurality of double faced mold plates of the same formation so that they need not be carefully arranged and each mold plate will form one side of one tile and another side of another tile, and these double faced mold plates can be readily removed and very quickly replaced in the mold boxes as they are all alike in size, shape and dimensions. Another cause of speed of production lies in the use of a hopper construction substantially as shown, whereby the material is distributed initially to the lateral portions of the mold boxes. Another cause is the vibration of the mold boxes to facilitate the settling of the material therein and rendering it of uniform density. Another cause is means for removing the mold boxes from beneath the supply tank 20 before the material therein has completely settled and running them onto another vibratory frame for the final and complete vibration of the material. This latter saves one half the time, for, while the latter part of the vibratory process is being carried on, another set of mold boxes will be under the hopper and be receiving their charges. Still another means for facilitating the production consists in removing the mold boxes as soon as the vibratory portion of the process is terminated, to the drying and curing rooms.

The foregoing steps in the process are carried on continuously in succession as above set forth, and with ample drying or curing room space, a large supply of roofing tiles can be manufactured at substantially the rate of 150 a minute.

In forming the roofing tiles as heretofore explained, I also provide nail holes 14 in the tiles for securing them to the roof. This is accomplished by providing the mold plates with corresponding holes 114 and inserting wire rods 60 longitudinally through the mold plates in the mold box, as shown in Fig. 2. The wire rods also extend through the header 36 and the ends of the mold boxes, as shown by the holes 214 in Fig. 1. After the roofing tiles in the mold boxes have sufficiently dried or become cured, the wires 60 are withdrawn, and at the proper time, the sides and ends of the mold boxes are turned down and thereafter the roofing tiles and the mold plates are removed.

While a very usual form of roofing tile is shown herein and a corresponding mold plate, the invention is not limited thereto, as the tiles and mold plate may be modified in details of construction to make various types of roofing tile, so far as this invention is concerned. Nor is the invention limited to the use of a plurality of mold boxes, nor to a mold box having room for any particular number of mold plates in it, nor to the particular construction of the slidable mounting of the mold boxes on the vibratory frames. While the invention is shown herein with the mold plates arranged lengthwise in vertical position, the invention is not limited to that position, for in making some types of tiles, it is preferable to have the mold plates placed in the box with the longitudinal dimension in horizontal position.

The invention claimed is:

1. In apparatus for making roofing tiles, a mold plate consisting of a plate, and similar vertical spacing ribs along the opposite lateral edges thereof and extending beyond the plane of the plate, whereby a plurality of adjacent mold plates can be spaced apart and form similar chambers between the mold plates for molding similar roofing tiles.

2. In apparatus for making roofing tiles, a plurality of similar mold plates, each mold plate consisting of a plate, and similar vertical spacing ribs along the opposite lateral edges thereof and extending beyond the plane of the plate, whereby similar tiles can be molded between said multiplicity of mold plates.

3. In apparatus for making roofing tiles, a mold plate consisting of a flat plate, and similar vertical spacing ribs with a recess between them on diagonally opposite sides of the plate at the lateral edges thereof and extending beyond the plane of the plate, whereby the mold plate will be provided with spacing ribs to separate a plurality of adjacent mold plates to form chambers between them for molding similar tiles.

4. In apparatus for making roofing tiles, a plurality of similar mold plates, each consisting of a flat plate, and a plurality of vertical spacing ribs with a recess between them on diagonally opposite sides of the plate at the lateral edges thereof and extending beyond the plane of the plate, whereby the spacing ribs on the mold plates will separate them and form between them chambers for molding similar tiles.

5. In apparatus for making roofing tiles, a mold box with an open top, and a plurality of similarly formed mold plates therein, each having vertical spacing ribs on opposite sides in diagonally opposite positions near the lateral edges, whereby the mold box may be quickly charged with said mold plates, and they will form a plurality of mold chambers between them open at the top for receiving by gravity material for molding similar roofing tiles.

6. Apparatus for making roofing tiles, including a stationary supply tank for plastic material which can flow by gravity therefrom, a mold box with an open top under said supply tank, a stationary frame below said supply tank, a vibratory frame for supporting the mold box, resilient means extending from said stationary frame up to said vibratory frame for supporting it so it can laterally vibrate, power driven means mounted on said stationary frame, and connecting bars pivoted to said vibratory frame and longitudinally reciprocated by said power means.

7. Apparatus for making roofing tiles including a stationary supply tank for plastic material which can flow by gravity therefrom, a mold box with an open top under said supply tank, a stationary frame below said supply tank, a vibratory frame for supporting the mold box, resilient means extending from said stationary frame up to said vibratory frame for supporting it so it can laterally vibrate, power driven means mounted on said stationary frame, and connecting bars pivoted to said vibratory frame and longitudinally reciprocated by said power means, a pair of parallel rails secured on said vibratory frame, and shoes secured to the bottom of the mold box with concave recesses on the underside to fit and slide on said rails.

8. Apparatus for making roofing tiles including a supply tank for the material with the bottom open, a slide valve for opening and closing said opening, a mold box with its upper end open and located under and space away from the opening in said supply tank, and a hopper member under the opening in the supply tank and resting upon the mold box and having in it suitably inclined plates for directing the material which flows by gravity from the supply tank and distributing the same to the mold box as desired.

9. Apparatus for making roofing tiles including a supply tank for the material with the bottom open, a slide valve for opening and closing said opening, a mold box with its upper end open and located under and spaced away from the opening in said supply tank, a hopper member resting on the mold box and under the opening in the supply tank, an A-shaped distributing member in the lower part of said hopper member for charging the material into the lateral portions of the mold box, and inclined plates in the upper part of said hopper member for concentrating the material and discharging it to the middle part of said A-shaped distributing member.

10. Apparatus for making roofing tiles including a mold box, a stationary supply tank above said mold box, and means for laterally vibrating said mold box while it is beneath the supply tank and also after it has been removed from charging position, whereby a second mold box may be charged while the preceding mold box is being further vibrated.

11. Apparatus for making roofing tiles including a stationary supply tank for the material, a first lateral vibratory frame stationary under said tank, a second lateral vibrating frame adjacent the hereinbefore mentioned vibrating frame, and means for supporting said mold boxes on said vibrating frames so that after a mold box has been charged from said tank it may be transferred to the second vibrating frame and be further vibrated while a succeeding mold box is being charged, substantially as set forth.

12. In apparatus for making roofing tiles, a mold plate consisting of a flat plate, and similar vertical spacing ribs on diagonally opposite sides of the plate at the lateral edges thereof and extending beyond the plane of the plate, whereby the mold plate will be provided with spacing ribs to separate a plurality of adjacent mold plates to form chambers between them for molding similar tiles.

13. In apparatus for making roofing tiles, a plurality of similar mold plates, each consisting of a flat plate, and a plurality of vertical spacing ribs on diagonally opposite sides of the plate at the lateral edges thereof and extending beyond the plane of the plate, whereby the spacing ribs on the mold plates will separate them and form between them chambers for molding similar tiles.

14. In apparatus for making roofing tiles and the like, a mold box, a plurality of similar mold plates therein each extending across said box and each comprising a plate having a pair of projecting ribs with a recess between them formed adjacent each lateral edge, the outer rib of each pair projecting sufficiently to contact the adjacent plate, the inner rib of each pair having less projection than the outer rib, the recess between said ribs being of less depth than the projection of the outer ribs, and the ribs adjacent one of said edges being on the opposite side of the plate from those adjacent the other of said edges.

15. In apparatus for making roofing tiles and the like, a mold box, a plurality of similar mold plates therein each extending across said box and each comprising a plate having a pair of projecting ribs formed adjacent each lateral edge, the outer rib of each pair projecting sufficiently to contact the adjacent plate, the inner rib of each pair having less projection than the outer rib, and the ribs adjacent one of said edges being on the opposite side of the plate from those adjacent the other of said edges.

OTTO WALTER.